(12) United States Patent
Bikumala et al.

(10) Patent No.: US 11,012,337 B1
(45) Date of Patent: May 18, 2021

(54) USING MACHINE LEARNING TO DETERMINE WHETHER NETWORK COMPONENTS ARE BEING USED AS INTENDED

(71) Applicant: Dell Products L. P., Round Rock, TX (US)

(72) Inventors: Sathish Kumar Bikumala, Round Rock, TX (US); Gregory Michael Ramsey, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/660,885

(22) Filed: Oct. 23, 2019

(51) Int. Cl.
| | | |
|---|---|---|
| *H04L 12/26* | (2006.01) |
| *H04L 12/24* | (2006.01) |
| *G06K 9/62* | (2006.01) |
| *H04L 29/06* | (2006.01) |
| *H04L 29/08* | (2006.01) |
| *H04L 12/717* | (2013.01) |

(52) U.S. Cl.
CPC ........ *H04L 43/0876* (2013.01); *G06K 9/6276* (2013.01); *H04L 41/5003* (2013.01); *H04L 43/062* (2013.01); *H04L 45/42* (2013.01); *H04L 63/102* (2013.01); *H04L 67/22* (2013.01)

(58) Field of Classification Search
CPC ........... G06F 9/46; G06F 9/451; G06F 17/30; G06Q 10/06; G06N 5/04; G06N 99/00; H04L 12/24; H04L 12/26; H04L 29/06; H04L 41/14; H04L 41/5003; H04L 43/062; H04L 43/0876; H04L 45/42; H04L 63/102; H04L 67/22; G06K 9/6276
See application file for complete search history.

(56) References Cited

U.S. PATENT DOCUMENTS

| | | | | |
|---|---|---|---|---|
| 9,565,080 B2 * | 2/2017 | Jain | ...................... | H04L 67/327 |
| 2009/0199196 A1 * | 8/2009 | Peracha | .............. | G06F 11/3452 |
| | | | | 718/104 |
| 2010/0299419 A1 * | 11/2010 | Ramankutty | ......... | H04W 24/02 |
| | | | | 709/221 |
| 2014/0351425 A1 * | 11/2014 | Madani | ................... | H04L 67/10 |
| | | | | 709/224 |
| 2017/0279891 A1 * | 9/2017 | Desai | ...................... | H04L 67/42 |
| 2020/0162503 A1 * | 5/2020 | Shurtleff | ............... | H04L 43/065 |

* cited by examiner

*Primary Examiner* — Thomas J Dailey
(74) *Attorney, Agent, or Firm* — Krishnendu Gupta; Deepika Bhayana; Dorothy Wu Chiang

(57) ABSTRACT

In some examples, a server may receive, from a software agent, data associated with a particular component of a plurality of components in a system (e.g., an information technology (IT) network). The data may include connection data, network location data, software data, user data, hardware data, and network routing data. The server may determine, using a k-nearest classification algorithm and based on the data, a current usage of the particular component. The server may determine an intended usage of the particular component and perform a comparison of the current usage with the intended usage. If the server determines that the current usage differs from the intended usage by at least a predetermined percentage, then the server may perform one or more remediation actions to modify the current usage to differ from the intended usage by less than the predetermined percentage.

20 Claims, 4 Drawing Sheets

USING MACHINE LEARNING TO DETERMINE WHETHER NETWORK COMPONENTS ARE BEING USED AS INTENDED

BACKGROUND OF THE INVENTION

Field of the Invention

This invention relates generally to determining a current usage of network components and comparing the current usage with an intended usage to determine if the network components are being used as intended.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a corporate environment, each department may fill out a requisition to purchase equipment, including infrastructure equipment (e.g., network components), such as computing devices (e.g., client devices, servers, and the like), networking equipment (e.g., switches, hubs, routers, load balancers, firewalls, and the like), and software (e.g., operating system, applications, and the like). Each requisition may specify an intended use for the equipment, such as, for example, a production environment (e.g., the equipment is put into operation to enable end users to use the equipment for a particular (intended) purpose), a development environment (e.g., where the equipment is used to develop software and/or hardware for use in a production environment), a test environment (e.g., where software and/or hardware that has been developed is tested before being placed in production), a sandbox environment (e.g., a production-like environment that is isolated to prevent issues from spreading to the production environment), and so on.

In a corporate environment, over time, as equipment is redeployed or repurposed, the original intent may give way to unintended usage of the equipment with corresponding unintended consequences. For example, a non-production server intended for testing may end up being used for production purposes, resulting in test routines executing in the background, causing sluggish response times for end users. Thus, the current usage of equipment may, over time, end up differing from the intended purpose, and cause adverse consequences.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive, from a software agent, data associated with a particular component of a plurality of components in a system (e.g., an information technology (IT) network). The particular component may be at least one of: (i) computing hardware comprising one of a server or a client computing device, (ii) networking hardware comprising one of a switch, a hub, a router, a firewall, a network security device, or a load balancer, or (iii) a software application comprising one of a database software application, an Enterprise Resource Planning (ERP) software application, a customer relationship management (CRM) software application, or a productivity suite. The data may include at least one of: (i) connection data including a type of connections and a bandwidth of each connection associated with the particular component, (ii) network location data identifying a network location of the particular component, (iii) software data identifying an installed operating system, installed software applications, and processes that are executing, (iv) user data identifying a number of users accessing the particular component, types of the users, rights associated with the users, and credentials associated with the users, (v) hardware data identifying a type and a speed of a central processing unit, an amount of processor usage, an amount of memory, an amount of memory usage, an amount of storage, and an amount of storage usage associated with the particular component, and (vi) network routing data identifying an incoming type of traffic being routed to the particular component, an outgoing type of traffic being routed from the particular component to other components of the plurality of components. The server may determine, based on the data, a current usage of the particular component. For example, the server may use a k-nearest classification machine learning algorithm to determine the current usage of the particular component based on a nearness of the current usage to a usage associated with other components of the plurality of components. The current usage may include at least one of: (i) a production usage in which end users are able to access the particular component, (ii) a development usage in which software developers are able to use the particular component to develop software, (iii) a test usage in which testers are able to test pre-production software using the particular component, (iv) a sandbox usage in which the pre-production software is tested in a way that does not affect other components of the plurality of components, or (v) a performance usage in which a performance of the pre-production software is tested under stress conditions. The server may determine an intended usage of the particular component by accessing (i) a plan or record, (ii) a provisioning database, or (iii) a configuration management database that indicates the intended usage of the particular component or indicates how the particular component was originally provisioned. The server may perform a comparison of the current usage with the intended usage to determine whether the current usage differs from the intended usage by at least a predetermined percentage. If the server determines that the current usage differs from the intended usage by at least a predetermined percentage, then the server may perform one or more remediation actions to modify the current usage to differ from the intended usage by less than the predetermined percentage. For example, the one or more remediation actions include at least one of: (i) uninstalling one or more software components currently installed in the particular component, (ii) installing one or more additional software components in the particular component, (iii) reconfiguring one or more network connections of the particular component, (iv) reconfiguring one or more security measure used by the particular component, (v) reconfiguring users allowed access to the particular component, (vi) reconfiguring one or more access levels or credentials associated with the users, (vii) reconfiguring one or more network components associated with the particular component, or (viii) deprovisioning one or more additional components of the plurality of components that interact with the particular component.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
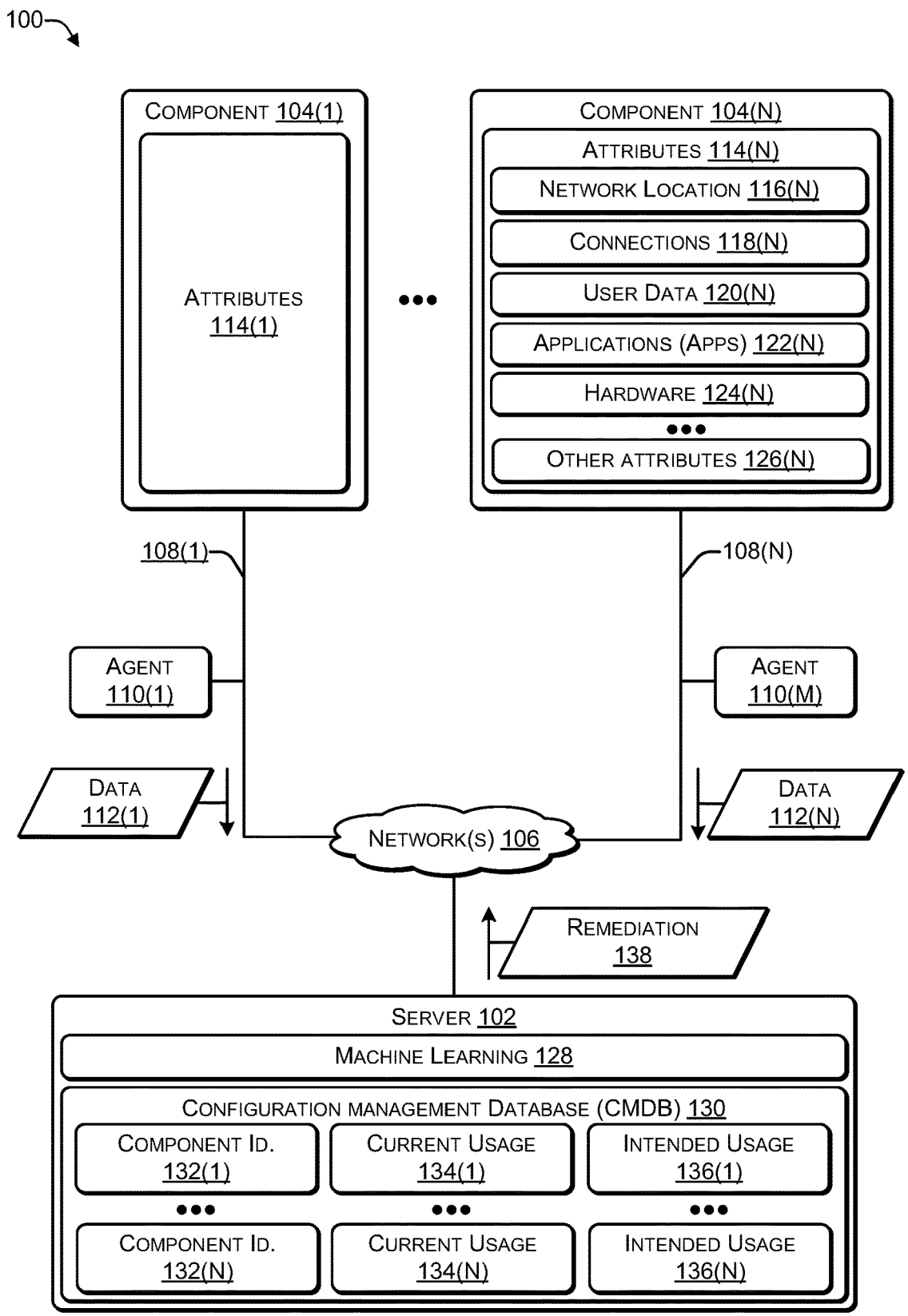
FIG. 1 is a block diagram of a system in which software agents are deployed to gather data (e.g., attributes) associated with individual components of the system, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein determine attributes associated with individual components (e.g., individual information handling systems (IHS)) in a system, such as a corporate information technology (IT) network. Typically, an IT network may include three types of components, e.g., (i) computing hardware, (ii) networking hardware, and (iii) software. The computing hardware may include servers and client computing devices (e.g., laptops, desktops, and the like). The networking hardware may include switches, hubs and routers, firewalls and other network security hardware, load balancer, and the like. The software may include operating systems and applications, such as, for example, database software, Enterprise Resource Planning (ERP) software, Customer Relationship Management (CRM) software, productivity suites (e.g., Microsoft Office), load balancers, and the like.

Information Technology Infrastructure Library (ITIL) is a set of detailed practices for IT service management that focuses on aligning IT services with the needs of the business. A Configuration Management Database (CMDB) is a database of information related to the components of the IT network and includes information about configuration items (CI) in the IT infrastructure, including hardware, software, personnel, and documentation. Thus, with respect to IT Asset Management, a CMDB may be viewed as a 'map' of the IT network that enables IT personnel to keep track of the state of hardware devices, software and data in the IT network.

Current technology enables a network component ("component") to be quickly added and provisioned (e.g., deployed) to an IT network. While rapid provisioning of components offers many advantages, one disadvantage is maintaining the integrity of the CMDB by keeping the CMDB consistent and accurate when components can be easily redeployed. Failure to maintain the accuracy of the CMDB may result in network outages that require significant time and effort to address. In addition, companies that fail to maintain an accurate CMDB may be subject to punishment under Federal and State laws, such as Sarbanes Oxley ("SOX"). For example, troubleshooting is resource intensive and could cause resources to become unavailable, leading to bad customer experiences, lost revenue, and penalties (e.g., for failing to maintain network availability as specified in a service level agreement (SLA)). This can be particularly important in large corporations that have tens of thousands (e.g., 10,000 to 100,000 or more) of servers deployed in their IT network.

Typically, intent (e.g., how a network component is intended to be used) is set prior to (or during) provisioning. For example, the intent may determine how a particular network component is provisioned. Intent may include, for example, development environment, testing environment, sandbox environment, production environment, and the like. In a corporate environment, the intent is typically manually updated and subject to interpretation. In addition, what someone plans to do with a component and how the component is currently being used can change over time. The initial intent for a component may be specified in a plan of record that describes how the component is intended to be used. The purpose of associating an intent with a component is to enable IT personnel to properly manage, monitor, enforce, provide security to, and troubleshoot the component. The originator of the request to provision usually sets the initial intent. The intent associated with a component may change over time. However, when the intent changes, humans may fail to update the appropriate CMDB records. Often the humans may be unaware that when the intent changes, the records are to be updated.

For example, when a component, such as a server, is purchased, the requisition may specify an intended use, such as, for example, production server, development server, or the like. The server may be deployed and have a fixed lifetime (e.g., 5 years). A problem may arise after the server is deployed and later ends up being used for a different purpose than was originally intended. For example, a non-production server may be used for software development or sandbox testing. Generally, in a corporate IT network, non-production servers are isolated from other servers, such as production servers, because the software under development may inadvertently delete data, cause the server to crash, hog resources, and the like. Thus, problems (e.g., unintended consequences) may arise if a server that is provisioned for non-production use is used as a production server or a server that is provisioned for production use is used as a non-production server. For example, data stored on a production server may be deleted or corrupted by software under development or a production server may provide users with a slow response due to runaway processes caused by software under development.

In general, there are three types of intent-related issues. First, a component may become mis-configured when the intended usage changes over time. Second, a component may end up being used for an unintended or obfuscated purpose when the intended usage changes over time. Third, a component that was intended to be deployed for a short period of time (e.g., as a temporary or stopgap measure) and then decommissioned ends up being re-deployed.

The systems and techniques described herein use software agents ("agents") to gather data (e.g., attributes) associated with individual components in the IT network and periodically (e.g., at a predetermined time interval) send the gathered data to a centrally-located server for analysis. For example, the centrally-located server may host or have access to the CMDB. The systems and techniques may use existing software monitoring agents, deploy additional software agent, or both. Each agent may gather data associated with individual components, including, for example, (1) device connections including the type of connections and the bandwidth of each connection to the individual component, (2) a network location of the component (e.g., network core, network edge, or the like), (3) software data such as an installed operating system, installed software, processes that are executing, (4) user data including types of users, user rights, user credentials, and the like, (5) hardware data, including type and speed of processor, processor usage, amount of memory and memory usage, amount of storage and storage usage, and the like and (6) network routing, including what type of traffic is being routed to the component, what type of traffic is being routed from the component.

The server may receive the gathered data and determine (e.g., predict), based on the data, the current usage of the component. For example, based on the data, the server may determine that the component is being used 90% for production tasks and 10% for non-production tasks. The server may then compare the current usage with the intended usage stored in the CMDB. If the current usage closely matches (e.g., 90%, 95%, 99% or the like) the intended usage, then no action may be taken. If the current usage diverges from the intended usage, then the server may automatically remediate by dynamically re-provisioning the component.

In some cases, machine learning (e.g., artificial intelligence) may be used to analyze the data (e.g., attributes) associated with a component to determine the type of usage associated with the component. For example, the machine learning algorithm may use supervised learning, in which computer software implementing the machine learning algorithm learns from the data provided by the multiple agents and uses the learning to make a subsequent determination (e.g., prediction). The data set may be bi-class (e.g., identifying whether the component is production or non-production) or the data set may be multi-class (e.g., production, testing, sandbox, development). More specifically, a k-nearest-neighbors classification algorithm may be used. The k-nearest-neighbors classification algorithm may use pre-labelled points to learn how to label additional points. To label a new point, the k-nearest-neighbors classification algorithm may examine the labelled points closest (e.g., k number of nearest neighbors) to the new point, and based on the labels of the nearest neighbors, label the new point accordingly. Thus, a new component that has attributes (i) similar to a production server may be labelled a production server, (ii) similar to a development server may be labelled a development server, (iii) similar to a test server may be labelled a test server, and so on. Over time, as a particular server deviates from the original intent, fewer of the attributes of the particular server may match the attributes of the neighbors. The machine learning algorithm may identify the deviation and automatically (e.g., without human interaction) perform one or more remedial measures, such as re-provisioning the particular server.

Thus, software agents dispersed throughout an IT network may gather data associated with individual components (e.g., server, client computing device, or the like) in the IT network and send the gathered data to a central server for analysis. The gathered data may be sent at a pre-determined time interval, such as every X hours, where X>0, such as X=1, 12, 24, 168 or the like. A machine learning algorithm that uses supervised learning (e.g., k-nearest neighbors or the like) may analyze the gathered data to determine the current use of the component. The server may determine, based on information stored in the CMDB and, in some cases, based also on the gathered data, an intended use of the component. The server may compare the current use with the intended use of the component. If the server determines that the current use of the component differs from the intended use by more than a predetermined amount (or percentage), then the server may automatically perform one or more remediation actions, including automatically re-provisioning the component to bring the current use closer to the intended use. The re-provisioning may include, for example, uninstalling one or more software components, installing one or more additional software components, re-configuring one or more network connections, re-configuring one or more security measures, reconfiguring users allowed access to the component, reconfiguring access levels associated with the users, reconfiguring network components, deprovisioning additional components in the IT network that interact with the component, and the like.

In some examples, a server may include one or more processors and one or more non-transitory computer-readable media storing instructions executable by the one or more processors to perform various operations. For example, the operations may include receiving, from a software agent, data associated with a particular component of a plurality of components in a system (e.g., an IT network). The particular component may be at least one of: (i) computing hardware comprising one of a server or a client computing device, (ii) networking hardware comprising one of a switch, a hub, a router, a firewall, a network security device, or a load balancer, or (iii) a software application comprising one of a database software application, an Enterprise Resource Planning (ERP) software application, a customer relationship management (CRM) software application, or a productivity suite. The data may include at least one of: (i) connection data including a type of connections and a bandwidth of each connection associated with the particular component, (ii) network location data identifying a network location of the particular component, (iii) software data identifying an installed operating system, installed software applications, and processes that are executing, (iv) user data identifying a number of users accessing the particular component, types of the users, rights associated with the users, and credentials associated with the users, (v) hardware data identifying a type and a speed of a central processing unit, an amount of processor usage, an amount of memory, an amount of memory usage, an amount of storage, and an amount of storage usage associated with the particular component, and (vi) network routing data identifying an incoming type of traffic being routed to the particular component, an outgoing type of traffic being routed from the particular component to other components of the plurality of components. The operations may include determining, based on the data, a current usage of the particular component. For example, determining, based on the data, the current usage of the particular component may include classifying, using a k-nearest classification algorithm, the current usage of the particular component based on a nearness of the current usage to a usage associated with other components of the plurality of components. The current usage may include at least one of: (i) a production usage in which end users are able to access the particular component, (ii) a development usage in which software developers are able to use the particular component to develop software, (iii) a test usage in which testers are able to test pre-production software using the particular component, (iv) a sandbox usage in which the pre-production software is tested in a way that does not affect other components of the plurality of components, or (v) a performance usage in which a performance of the pre-production software is tested under stress conditions. The operations may include determining an intended usage of the particular component. For example, determining the intended usage of the particular component may include accessing (i) a plan or record, (ii) a provisioning database, or (iii) a configuration management database that indicates the intended usage of the particular component or indicates how the particular component was originally provisioned. The operations may include performing a comparison of the current usage with the intended usage. The operations may include determining, based on the comparison, that the current usage differs from the intended usage by at least a predetermined percentage. The operations may include performing one or more remediation actions to modify the current usage to differ from the intended usage by less than the predetermined percentage. For example, the one or more remediation actions comprise at least one of: (i) uninstalling one or more software components currently installed in the particular component, (ii) installing one or more additional software components in the particular component, (iii) reconfiguring one or more network connections of the particular component, (iv) reconfiguring one or more security measure used by the particular component, (v) reconfiguring users allowed access to the particular component, (vi) reconfiguring one or more access levels or credentials associated with the users, (vii) reconfiguring one or more network components associated with the particular component, or (viii) deprovisioning one or more additional components of the plurality of components that interact with the particular component.

FIG. 1 is a block diagram of a system 100 in which software agents are deployed to gather data (e.g., attributes) associated with individual components of the system, according to some embodiments. In the system 100, a server 102 may be coupled to multiple network components 104(1) to component 104(N) (N greater than zero) via one or more networks 106. Each of the components 104 may be connected to the network 106 via a connection. For example, the component 104(1) may be connected to the network 106 via a connection 108(1) and the component 104(N) may be connected to the network 106 via a connection 108(N).

Multiple agents 110 may be deployed in the system 100 to gather data associated with individual ones of the components 104. The agents 110 may include existing software agents currently used to gather data that may be asked to gather additional or different data, as described herein, as well as new software agents deployed to gather data. For example, an agent 110(1) may gather data associated with the component 104(1) and an agent 110 (M) may gather data associated with the component 104(N) (where N>=M>0 and M not necessarily equal to N). In some cases, one agent may gather data associated with more than one of the components 104 in the system 100.

For example, the agent 110 one may gather data 112(1) associated with the component 104(1) and send the data 112(1) to the server 102. The agent 110(M) may gather data 112(N) associated with the component 104(N) and send the data 112(N) to the server 102.

The data 112 may include one or more attributes associated with a usage of the corresponding component. For example, the data 112(N) may include attributes 114(N), such as, for example, a network location 116(N), network connections 118(N), user data 120(N), applications 122(N), hardware data 124(N), and other attributes 126(N). The network location 116(N) may identify where in the system 100 the component 104(N) is located, e.g., which other components are near the component 104(N), whether the component 104(N) is at the edge or at the core of the system 100, and so on. The connections 118(N) may identify the type (e.g., wired or wireless) of the connection 108(N), a type of protocol used by the connection 108(N), a bandwidth of the connection 108(N), and other connection related information. The user data 120(N) may include information on which users (e.g., software developers, IT personnel, end users, or the like) have access to the component 104(N), what permission levels the users have, what access level the users have, and other user-related data. The applications 122(N) may identify which software applications are installed on the component 104(N) and which processes (including daemons and the like) are active (e.g., executing) on the component 104(N). The installed applications 122(N) may indicate an intended usage while the executing processes may indicate a current usage. For example, if software development applications are installed, then the component 104(N) may be intended to be used for software development. If software testing applications are installed, then the component 104(N) may be intended to be used for software testing. If production applications are installed, then the component 104(N) may be intended to be used for production (e.g., for use with end users). If software development applications are executing, then the component 104(N) is likely being used for software development. If software testing applications are executing, then the component 104(N) is likely being used for software testing. If production applications are executing, then the component 104(N) is likely being used for production (e.g., for use with end users). The hardware data 124(N) may identify hardware information, including what the component 104(N) does (e.g., firewall, internet security, packet sniffer, load balancer, server, client device, user gateway, and the like). For example, for a server, the hardware data 124(N) the processor, the processor speed, the amount of random-access memory (RAM), the amount of storage, and the like. The hardware data 124(N) may be used to determine an intended usage. For example, the corporation may specify that (i) development servers have a first type/speed of processor, a first amount of memory, and a first amount of storage, (ii) test servers have a second type/speed of processor, a second amount of memory, and a second amount of storage, (iii) production servers have a third type/speed of processor, a third amount of memory, and a third amount of storage, and so on.

The agents 110 may send the data 112 to the server 102 at a pre-determined time interval, such as every X hours, where X>0, such as X=1, 12, 24, 168 or the like. The agents 110 may stagger when the data 112 is sent such that the server 102 does not receive all the data 112 within a short interval of time, enabling the server 102 time to process the data 112 that is received from the agents 110.

After the server 102 receives the data 112, a machine learning algorithm 128 may analyze the data 112 to determine a current usage 134 associated with the corresponding component 104. For example, after receiving the data 112(1) associated with the component 104(1), the machine learning algorithm 128 may determine a current usage 134(1) associated with the component 104(1), and after receiving the data 112(N) associated with the component 104(N), the machine learning algorithm 128 may determine a current usage 134(N) associated with the component 104(N). The current usage 134 may be stored in the CMDB 130. The CMDB 130 may include multiple records, including a component identifier 132(1) to 132(N) that identifies each of the components 104(1) to 104(N), respectively. For example, the component identifier 132 may be an internet protocol (IP) address, a media access control (MAC) address, a serial number, a service tag identifier, or other identifier that uniquely identifies the component 104 in the system 100. The component identifier 132(1) may uniquely identify the component 104(1) and the component identifier 132(N) may uniquely identify the component 104(N). The CMDB may store an intended usage 136 associated with each component 104 that may be derived from a plan of record, a provisioning order, or the like. The intended usage 136(1) may be associated with the component 104(1) and the intended usage 136(N) may be associated with the component 104(N).

After receiving the data 112(N) associated with the component 104(N), the machine learning algorithm 128 may determine the current usage 134(N) associated with the component 104(N) and compare the current usage 134(N) with the intended usage 136(N). If the current usage 134(N) closely matches (e.g., is within a predetermined amount or a predetermined percentage of) the intended usage 136(N), then the server 102 may take no action. If the current usage 134(N) differs significantly (e.g., by at least a predetermined amount or a predetermined percentage) from the intended usage 136(N), then the server 102 may automatically perform one or more remediation actions 138.

The machine learning algorithm 128 may analyze the data 112 (e.g., attributes 114) associated with a particular component of the components 104 to determine the current usage 134 associated with the particular component. For example, the machine learning algorithm 128 may use supervised learning, in which computer software implementing the machine learning algorithm 128 learns from the data 112 provided by the multiple agents 110 and uses the learning to make a subsequent determination (e.g., prediction) regarding current usage. The data set may be bi-class (e.g., identifying whether the component is production or non-production) or the data set may be multi-class (e.g., production, testing, sandbox, development). For example, the machine learning algorithm 128 may use a k-nearest-neighbors classification algorithm. The k-nearest-neighbors classification algorithm may use pre-labelled points to learn how to label additional points. To label a new point, the k-nearest-neighbors classification algorithm may examine the labelled points closest (e.g., k number of nearest neighbors) to the new point, and based on the labels of the nearest neighbors, label the new point accordingly. Thus, a component that has attributes (i) similar to a production server may be labelled a production server, (ii) similar to a development server may be labelled a development server, (iii) similar to a test server may be labelled a test server, and so on. Over time, as a particular component deviates from the original intent, fewer of the attributes of the component may match the attributes of the neighbors. The machine learning algorithm 128 may identify the deviation and automatically (e.g., without human interaction) perform one or more remedial measures 138, such as re-provisioning the component.

Thus, software agents that currently gather data may be used to gather particular attributes associated with individual components in a system (e.g., an IT network). In some cases, e.g., where software agents are not available or lack the bandwidth to gather data, new software agents may be deployed in the system. Each software agent may gather data associated individual components in the system. For example, for a particular component, a software agent may determine a network location of the particular component, network connections associated with the particular component, user-related information associated with the particular component, applications installed on the particular component, processes executing on the particular component, hardware data (e.g., hardware configuration) of the particular component, and other attributes associated with the particular component. Individual software agents may periodically send the gathered data to a central server for analysis. The central server may receive the gathered data and perform an analysis, e.g., using machine learning, to determine how the component is currently being used. The server may retrieve an intended usage of the component from a CMDB and compare the current usage of the component with the intended usage. If the current usage closely matches (e.g., is within a predetermined amount or a predetermined percentage of) the intended usage, then the server may store the current usage (e.g., in the CMDB) and not perform any remediation actions. If the current usage does not match (e.g., exceeds by a predetermined amount or a predetermined percentage) the intended usage, then the server may automatically perform one or more remediation actions, including re-provisioning the component to enable the current usage to more closely match the intended usage. For example, the remediation actions may include changing a location of the component in the system (e.g., an edge device is moved to the core or a core device is moved to the edge), re-provisioning the network connections (e.g., removing connections between a production component and a non-production component, adding connections between a first non-production component and a second non-production component, adding connections between a first production component and a second production component), modifying which users are allowed access to the component (e.g., denying software developers access to a production component, denying end users access to a non-production component), modifying access and/or permission levels of users, re-provisioning hardware, or the like. In this way, the system may determine whether a component's usage is drifting from the component's intended usage and automatically correct the usage to more closely match the intended usage.

Figure 2:
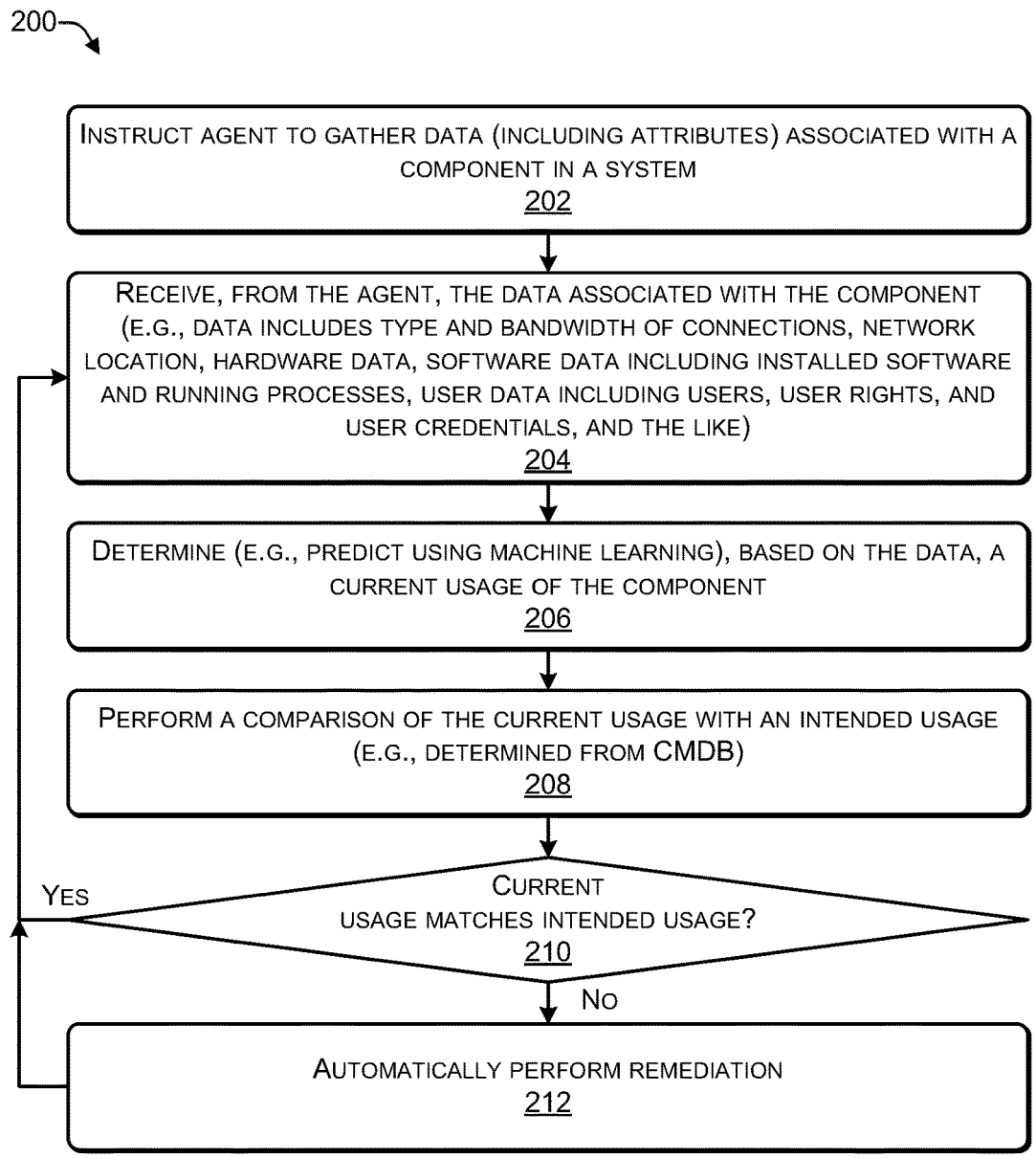
FIG. 2 is a flowchart of a process that includes determining (e.g., predicting using machine learning) a type of usage of a system component and comparing the type of usage with an intended usage, according to some embodiments.
Figure 3:
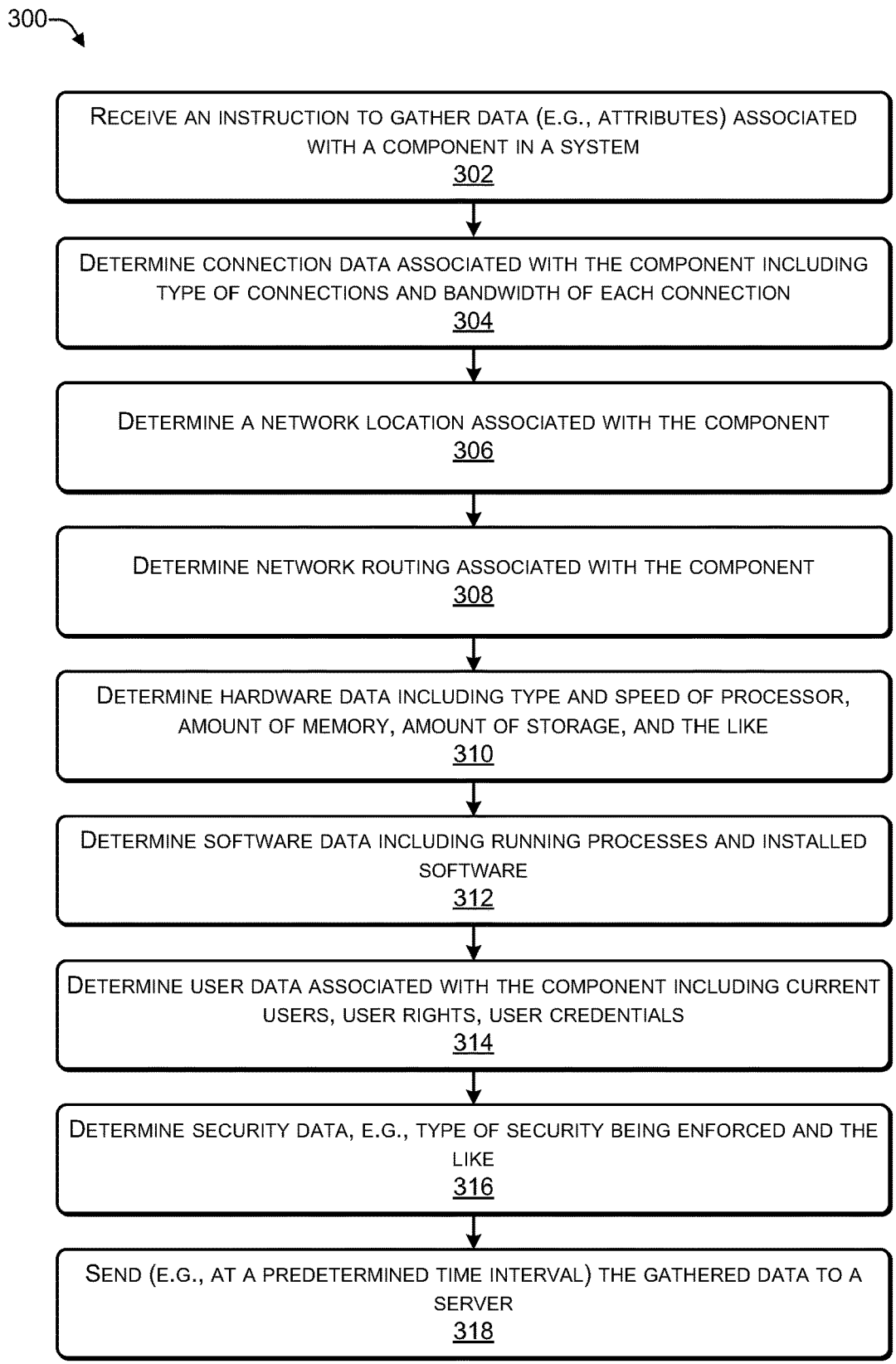
FIG. 3 is a flowchart of a process that includes sending data (e.g., attributes) associated with a system component to a server, according to some embodiments.

In the flow diagram of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1 as described above, although other models, frameworks, systems and environments may be used to implement these processes.

FIG. 2 is a flowchart of a process 200 that includes determining (e.g., predicting using machine learning) a type of usage of a system component and comparing the type of usage with an intended usage, according to some embodiments. The process 200 may be performed by the server 102 of FIG. 1.

At 202, the process may instruct an agent to gather data (including attributes) associated with a component in a system. At 204, the process may receive the data from the agent. For example, in FIG. 1, the server 102 may instruct the multiple agents 110 to gather data associated with individual ones of the components 104. The agents 110 may send the data 112 to the server 102 at a pre-determined time interval, such as every X hours, where X>0. The data 112(N) may include the attributes 114(N), such as, for example, the network location 116(N), the network connections 118(N), the user data 120(N), the applications 122(N), the hardware data 124(N), and the other attributes 126(N).

At 206, the process may determine (e.g., predict using machine learning), based on the data, a current usage of the component. At 208, the current usage may be compared with an intended usage (e.g., determine from data stored in a CMDB). For example, in FIG. 1, the machine learning algorithm 128 may analyze the data 112 to determine the current usage 134 associated with the corresponding component 104. The machine learning algorithm 128 may use supervised learning, in which computer software implementing the machine learning algorithm 128 learns from the data 112 provided by the multiple agents 110 and uses the learning to make a subsequent determination (e.g., prediction) regarding current usage. The server 102 may compare the current usage 134(N) with the intended usage 136(N).

At 210, the process may determine, based on the comparison, whether the current usage matches the intended usage. If the process determines, at 210, that the current usage matches the intended usage, then the process may proceed to 204, where additional data associated with the component may be received from the agent. If the process determines, at 210, that the current usage does not match the intended usage, then the process may proceed to 212, where the process may automatically perform one or more remediation actions. The process may proceed to 204, where additional data associated with the component may be received from the agent. For example, in FIG. 1, if the current usage 134(N) closely matches (e.g., is within a predetermined amount or a predetermined percentage of) the intended usage 136(N), then the server 102 may take no action. If the current usage 134(N) differs significantly (e.g., by at least a predetermined amount or a predetermined percentage) from the intended usage 136(N), then the server 102 may automatically perform one or more remediation actions 138. For example, based on the data 112, the server 102 may determine that the component 104 is being used 90% for production tasks and 10% for non-production tasks. The server 102 may then compare the current usage 134 (e.g., actual usage) with the intended usage 136 stored in the CMDB 130. If the current usage 134 closely matches (e.g., 90%, 95%, 99% or the like) the intended usage 136, then no action may be taken. If the current usage 134 differs from the intended usage 136 by more than a predetermined percentage or predetermined amount, then the server 102 may automatically perform the remediation 138 to dynamically re-provision the component 104. For example, if the component 104(N) is being used less than 90% of the time for production and the intended usage is production, then the server 102 may perform the remediation 138 to reduce the non-production usage. If the component 104(N) is being used at least 90% of the time for production and the intended usage is production, then the server 102 may not perform the remediation 138 but may store the current usage in the CMDB 130. For example, IT support personnel may examine the current usage 134 stored in the CMDB 130 to determine if the usage has drifted over time. For example, a component may initially (e.g., after deployment and provisioning) be used 98% for production tasks and, over time, the component may currently be used 90% for production tasks, showing that the usage has changed over time.

Thus, a server may instruct software agents deployed in a system to gather data (e.g., particular attributes) associated with individual components in the system (e.g., an IT network). Each software agent may gather data associated individual components in the system. For example, for a particular component, a software agent may determine a network location of the particular component, network connections associated with the particular component, user-related information associated with the particular component, applications installed on the particular component, processes executing on the particular component, hardware data (e.g., hardware configuration) of the particular component, and other attributes associated with the particular component. Individual software agents may periodically send the gathered data to a central server for analysis. The central server may receive the gathered data and perform an analysis, e.g., using machine learning, to determine how the component is currently being used. For example, the machine learning may use a k-nearest-neighbors classification or similar algorithm. The server may retrieve an intended usage of the component from a CMDB and compare the current usage of the component with the intended usage. If the current usage closely matches (e.g., is within a predetermined amount or a predetermined percentage of) the intended usage, then the server may store the current usage (e.g., in the CMDB) and not perform any remediation actions. If the current usage does not match (e.g., exceeds by a predetermined amount or a predetermined percentage) the intended usage, then the server may automatically perform one or more remediation actions, including re-provisioning the component to enable the current usage to more closely match the intended usage. For example, the remediation actions may include changing a location of the component in the system (e.g., an edge device is moved to the core or a core device is moved to the edge), re-provisioning the network connections (e.g., removing connections between a production component and a non-production component, adding connections between a first non-production component and a second non-production component, adding connections between a first production component and a second production component), modifying which users are allowed access to the component (e.g., denying software developers access to a production component, denying end users access to a non-production component), modifying access and/or permission levels of users, re-provisioning hardware, or the like. In this way, the system may determine whether a component's usage is drifting from the component's intended usage and automatically correct the usage to more closely match the intended usage.

FIG. 3 is a flowchart of a process 300 that includes sending data (e.g., attributes) associated with a system component to a server, according to some embodiments. The process 300 may be performed by individual ones of the agents 110 of FIG. 1.

At 302, the process may receive an instruction (e.g., from a server) to gather data (e.g., attributes) associated with a component in a system (e.g., an IT network). For example, in FIG. 1, the multiple agents 110 may be deployed in the system 100 and instructed by the server 102 to gather the data 112 associated with individual ones of the components 104.

At 304, the process may determine connection data associated with the component, including a type of the connections and a bandwidth of each connection. At 306, the process may determine a network location associated with the component. For example, in FIG. 1, the agent 110(M) may determine the data 112(N) associated with the component 104(N). The agent 110(M) may determine the connections 118(N) and the network location 116(N) of the component 104(N).

At 308, the process may determine network routing associated with the component. At 310, the process may determine hardware data, including a type and a speed of a processor, an amount of memory, an amount of storage, and other hardware data associated with the component. For example, in FIG. 1, the agent 110(M) may determine the hardware 124 (N), such as for example, the networking routing and a hardware configuration of the component 104.

At 312, the process may determine software data, including installed software and running processes, associated with the component. At 314, the process may determine user data, including current users, user rights, user credentials, and the like, associated with the component. At 316, the process may determine security data associated with the component, such as a type of security being enforced on the component, and the like. For example, in FIG. 1, the agent 110(M) may determine the applications 122(N) and the user data 120(N) including security (e.g., user access, user credentials, and the like).

At 318, the process may send (e.g., at a predetermined time interval) the data (e.g., the attributes) to a server. For example, in FIG. 1, the agents 110 may send the data 112 to the server 102 at a pre-determined time interval, such as every X hours, where X>0. The agents 110 may stagger when the data 112 is sent such that the server 102 does not receive all the data 112 within a short interval of time, enabling the server 102 time to process the data 112 that is received from the agents 110.

Thus, a server may instruct software agents deployed in a system to gather data (e.g., particular attributes) associated with individual components in the system (e.g., an IT network). Each software agent may gather data associated individual components in the system. For example, for a particular component, a software agent may determine a network location of the particular component, network connections associated with the particular component, user-related information associated with the particular component, applications installed on the particular component, processes executing on the particular component, hardware data (e.g., hardware configuration) of the particular component, and other attributes associated with the particular component. Individual software agents may periodically send the gathered data to a central server for analysis. The central server may receive the gathered data and perform an analysis, e.g., using machine learning, to determine how the component is currently being used. For example, the machine learning may use a k-nearest-neighbors classification or similar algorithm. The server may retrieve an intended usage of the component from a CMDB and compare the current usage of the component with the intended usage. If the current usage closely matches (e.g., is within a predetermined amount or a predetermined percentage of) the intended usage, then the server may store the current usage (e.g., in the CMDB) and not perform any remediation actions. If the current usage does not match (e.g., exceeds by a predetermined amount or a predetermined percentage) the intended usage, then the server may automatically perform one or more remediation actions, including re-provisioning the component to enable the current usage to more closely match the intended usage.

Figure 4:
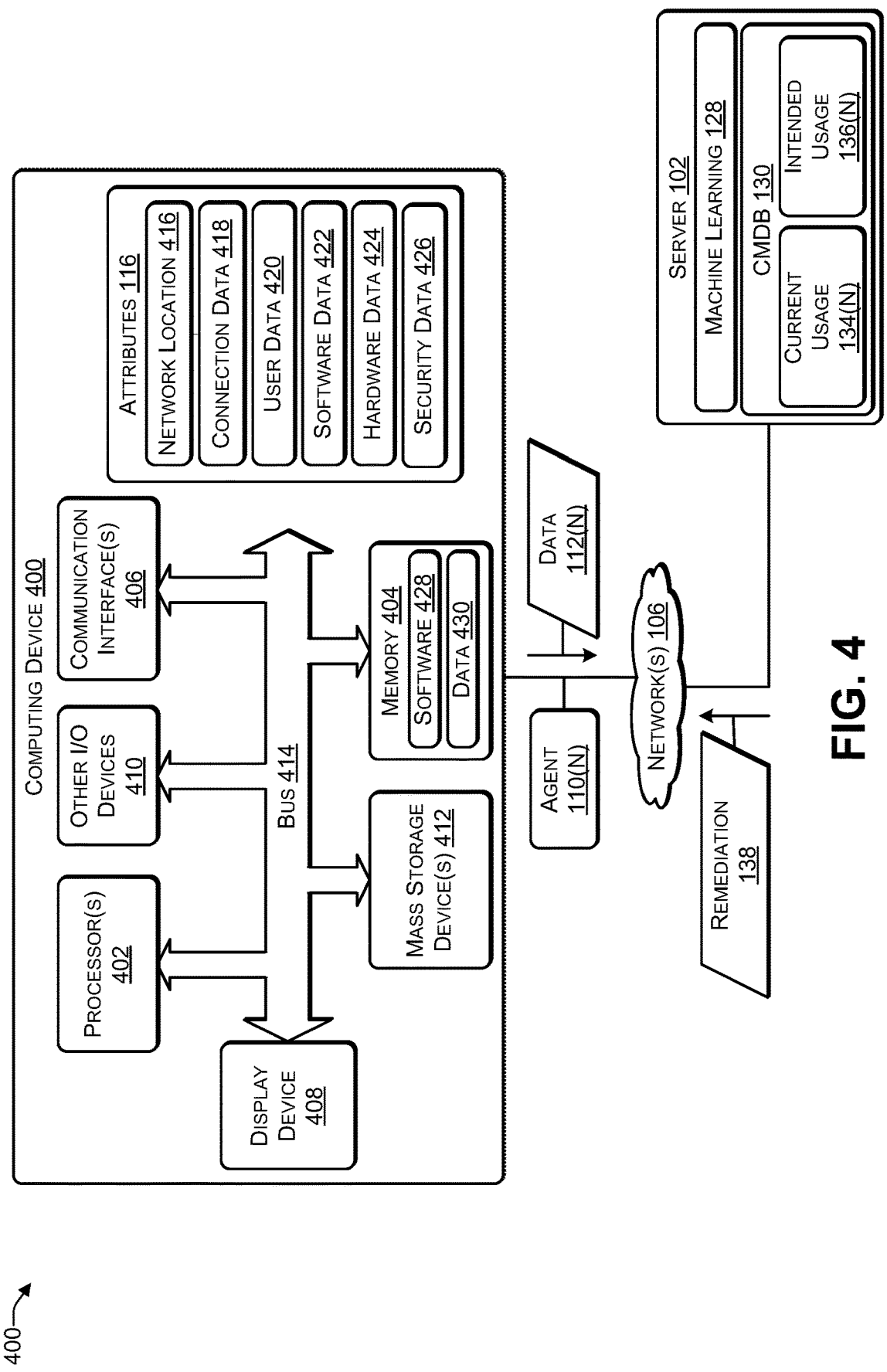
FIG. 4 illustrates an example configuration of a computing device that can be used to implement the systems and techniques described herein.

FIG. 4 illustrates an example configuration of a computing device 400 that can be used to implement the systems and techniques described herein, such as for example, the server 102 and the components 104 of FIG. 1. For illustration purposes, the computing device 400 is illustrated in FIG. 4 as implementing the server 102 of FIG. 1.

The computing device 400 may include one or more processors 402 (e.g., CPU, GPU, or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store software 428 (e.g., operating system, drivers, software applications, and the like) and data 430.

Thus, software agents, such as the agent 110(N), may be deployed throughout an IT network to gather the data 112(N) associated with an individual component, such as the computing device 400 (e.g., the component 104(N) of FIG. 1), and send the gathered data 112(N) to the server 102 for analysis. The gathered data 112(N) may be sent at a predetermined time interval, such as every X hours, where X>0. The machine learning algorithm 128 may use supervised learning (e.g., k-nearest neighbors or the like) to analyze the gathered data 112 to determine the current usage 134(N) of the computing device 400. The server 102 may determine, based on information stored in the CMDB and, in some cases, based also on the gathered data 112(N), the intended usage 136(N) of the computing device 400. The server 102 may compare the current usage 134(N) with the intended usage 136(N) of the computing device 400. If the server 102 determines that the current usage 134(N) of the computing device 400 differs from the intended usage 136(N) by more than a predetermined amount (or percentage), then the server 102 may automatically perform one or more remediation actions 138, including automatically re-provisioning the computing device 400 to bring the current use closer to the intended use. The re-provisioning may include, for example, uninstalling one or more software components, installing one or more additional software components, re-configuring one or more network connections, changing a network location of the component, re-configuring one or more security measures, reconfiguring users allowed access to the component, reconfiguring access levels associated with the users, reconfiguring network components, deprovisioning additional components in the IT network that interact with the component, changing security measures associated with the component, and the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors and from a software agent, data associated with a particular component of a plurality of components in a system;
   determining, by the one or more processors and based on the data, a current operational role of the particular component with respect to operational roles of other components of the plurality of components in the system;

determining, by the one or more processors, an intended operational role of the particular component;

performing, by the one or more processors, a comparison of the current operational role with the intended operational role;

determining, by the one or more processors and based on the comparison, that the current operational role differs from the intended operational role by at least a predetermined percentage; and performing, by the one or more processors, one or more remediation actions to modify the current operational role to differ from the intended operational role by less than the predetermined percentage.

2. The method of claim 1, wherein the particular component comprises at least one of:

computing hardware comprising one of a server or a client computing device;

networking hardware comprising one of a switch, a hub, a router, a firewall, a network security device, or a load balancer; or a software application comprising one of a database software application, an Enterprise Resource Planning (ERP) software application, a customer relationship management (CRM) software application, or a productivity suite.

3. The method of claim 1, wherein the data comprises at least one of:

connection data including a type of connections and a bandwidth of each connection associated with the particular component;

network location data identifying a network location of the particular component;

software data identifying an installed operating system, installed software applications, and processes that are executing user data identifying a number of users accessing the particular component, types of the users, rights associated with the users, credentials associated with the users;

hardware data identifying a type and a speed of a central processing unit, an amount of processor usage, an amount of memory, an amount of memory usage, an amount of storage, and an amount of storage usage associated with the particular component; and network routing data identifying an incoming type of traffic being routed to the particular component, an outgoing type of traffic being routed from the particular component to other components of the plurality of components.

4. The method of claim 1, wherein determining the intended operational role of the particular component comprises:

accessing a plan or record, a provisioning database, or a configuration management database that indicates the intended operational role of the particular component.

5. The method of claim 1, wherein determining, based on the data, the current operational role of the particular component comprises:

classifying, using a k-nearest classification algorithm, the current operational role of the particular component based on a nearness of a current usage of the particular component to a usage associated with one or more of a plurality of operational role classifications.

6. The method of claim 1, wherein the one or more remediation actions comprise at least one of:

uninstalling one or more software components currently installed in the particular component;

installing one or more additional software components in the particular component;

reconfiguring one or more network connections of the particular component;

reconfiguring one or more security measure used by the particular component;

reconfiguring users allowed access to the particular component;

reconfiguring one or more access levels or credentials associated with the users;

reconfiguring one or more network components associated with the particular component; or deprovisioning one or more additional components of the plurality of components that interact with the particular component.

7. The method of claim 1, wherein the current operational role comprises at least one of:

a production usage in which end users are able to access the particular component;

a development usage in which software developers are able to use the particular component to develop software;

a test usage in which testers are able to test pre-production software using the particular component;

a sandbox usage in which the pre-production software is tested in a way that does not affect other components of the plurality of components; or a performance usage in which a performance of the pre-production software is tested under stress conditions.

8. A server comprising:

one or more processors; and one or more non-transitory computer-readable media storing instructions executable by the one or more processors to perform operations comprising:

receiving, from a software agent, data associated with a particular component of a plurality of components in a system;

determining, based on the data, a current operational role of the particular component with respect to operational roles of other components of the plurality of components in the system;

determining an intended operational role of the particular component with respect to other components of the plurality of components of the system;

performing a comparison of the current operational role with the intended operational role;

determining, based on the comparison, that the current operational role differs from the intended operational role by at least a predetermined percentage; and performing one or more remediation actions to modify the current operational role to differ from the intended operational role by less than the predetermined percentage.

9. The server of claim 8, wherein the particular component comprises at least one of:

computing hardware comprising one of a server or a client computing device;

networking hardware comprising one of a switch, a hub, a router, a firewall, a network security device, or a load balancer; or a software application comprising one of a database software application, an Enterprise Resource Planning (ERP) software application, a customer relationship management (CRM) software application, or a productivity suite.

10. The server of claim 8, wherein the data comprises at least one of:
- connection data including a type of connections and a bandwidth of each connection associated with the particular component;
- network location data identifying a network location of the particular component;
- software data identifying an installed operating system, installed software applications, and processes that are executing
- user data identifying a number of users accessing the particular component, types of the users, rights associated with the users, credentials associated with the users;
- hardware data identifying a type and a speed of a central processing unit, an amount of processor usage, an amount of memory, an amount of memory usage, an amount of storage, and an amount of storage usage associated with the particular component; and
- network routing data identifying an incoming type of traffic being routed to the particular component, an outgoing type of traffic being routed from the particular component to other components of the plurality of components.

11. The server of claim 8, wherein determining, based on the data, the current operational role of the particular component comprises:
- classifying, using a k-nearest classification algorithm, the current operational role of the particular component based on a nearness of a current usage of the particular component to a usage associated with one or more of a plurality of operational role classifications.

12. The server of claim 8, wherein the one or more remediation actions comprise at least one of:
- uninstalling one or more software components currently installed in the particular component;
- installing one or more additional software components in the particular component;
- reconfiguring one or more network connections of the particular component;
- reconfiguring one or more security measure used by the particular component;
- reconfiguring users allowed access to the particular component;
- reconfiguring one or more access levels or credentials associated with the users;
- reconfiguring one or more network components associated with the particular component; or
- deprovisioning one or more additional components of the plurality of components that interact with the particular component.

13. The server of claim 8, wherein the current operational role comprises at least one of:
- production usage in which end users are able to access the particular component;
- development usage in which software developers are able to use the particular component to develop software;
- test usage in which testers are able to test pre-production software using the particular component;
- sandbox usage in which the pre-production software is tested in a way that does not affect other components of the plurality of components; or
- performance usage in which a performance of the pre-production software is tested under stress conditions.

14. One or more non-transitory computer readable media storing instructions executable by one or more processors to perform operations comprising:
- receiving, from a software agent, data associated with a particular component of a plurality of components in a system;
- determining, based on the data, a current operational role of the particular component with respect to operational roles of other components of the plurality of components in the system;
- determining an intended operational role of the particular component with respect to other components of the plurality of components of the system;
- performing a comparison of the current operational role with the intended operational role;
- determining, based on the comparison, that the current operational role differs from the intended operational role by at least a predetermined percentage; and
- performing one or more remediation actions to modify the current operational role to differ from the intended operational role by less than the predetermined percentage.

15. The one or more non-transitory computer readable media of claim 14, wherein the particular component comprises at least one of:
- computing hardware comprising one of a server or a client computing device;
- networking hardware comprising one of a switch, a hub, a router, a firewall, a network security device, or a load balancer; or
- a software application comprising one of a database software application, an Enterprise Resource Planning (ERP) software application, a customer relationship management (CRM) software application, or a productivity suite.

16. The one or more non-transitory computer readable media of claim 14, wherein the data comprises at least one of:
- connection data including a type of connections and a bandwidth of each connection associated with the particular component;
- network location data identifying a network location of the particular component;
- software data identifying an installed operating system, installed software applications, and processes that are executing
- user data identifying a number of users accessing the particular component, types of the users, rights associated with the users, credentials associated with the users;
- hardware data identifying a type and a speed of a central processing unit, an amount of processor usage, an amount of memory, an amount of memory usage, an amount of storage, and an amount of storage usage associated with the particular component; and
- network routing data identifying an incoming type of traffic being routed to the particular component, an outgoing type of traffic being routed from the particular component to other components of the plurality of components.

17. The one or more non-transitory computer readable media of claim 14, wherein determining the intended operational role of the particular component comprises:
- accessing a plan or record, a provisioning database, or a configuration management database that indicates the intended operational role of the particular component or indicates how the particular component was originally provisioned.

18. The one or more non-transitory computer readable media of claim 14, wherein determining, based on the data, the current operational role of the particular component comprises:

classifying, using a k-nearest classification algorithm, the current operational role of the particular component based on a nearness of a current usage of the particular component to a usage associated with one or more of a plurality of operational role classifications.

19. The one or more non-transitory computer readable media of claim 14, wherein the one or more remediation actions comprise at least one of:

uninstalling one or more software components currently installed in the particular component;

installing one or more additional software components in the particular component;

reconfiguring one or more network connections of the particular component;

reconfiguring one or more security measure used by the particular component;

reconfiguring users allowed access to the particular component;

reconfiguring one or more access levels or credentials associated with the users;

reconfiguring one or more network components associated with the particular component; or deprovisioning one or more additional components of the plurality of components that interact with the particular component.

20. The one or more non-transitory computer readable media of claim 14, wherein the current operational role comprises at least one of:

a production usage in which end users are able to access the particular component;

a development usage in which software developers are able to use the particular component to develop software;

a test usage in which testers are able to test pre-production software using the particular component;

a sandbox usage in which the pre-production software is tested in a way that does not affect other components of the plurality of components; or a performance usage in which a performance of the pre-production software is tested under stress conditions.

\* \* \* \* \*